United States Patent
Tahir et al.

(10) Patent No.: US 9,071,390 B2
(45) Date of Patent: Jun. 30, 2015

(54) ADJUSTING PHYSICAL LAYER TRANSMISSION PROPERTIES

(71) Applicant: QUALCOMM Incorporated, San Diego, CA (US)

(72) Inventors: Ehab Tahir, Ontario (CA); Nikolai Kroupetski, Ontario (CA); John Fraser Chappel, Ontario (CA); Brian James Langlais, Ontario (CA); Joubin Karimi, Ontario (CA); Richard D. Roze, Ontario (CA); Son Binh Cam, Ontario (CA)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 13/738,594

(22) Filed: Jan. 10, 2013

(65) Prior Publication Data

US 2014/0192851 A1    Jul. 10, 2014

(51) Int. Cl.
*H04L 27/34* (2006.01)
*H04L 1/00* (2006.01)
*H04L 25/02* (2006.01)

(52) U.S. Cl.
CPC ............... *H04L 1/0001* (2013.01); *H04L 25/02* (2013.01)

(58) Field of Classification Search
CPC ... H04L 5/0044; H04L 5/0007; H04L 9/0838; H04L 5/0064; H04L 1/0001; H04L 12/413; H04L 1/0009; H04L 1/1671; H04L 1/1887; H04L 2001/0094; H04L 27/0006; H04L 27/2628; H04L 27/2643; H04L 47/826
See application file for complete search history.

(56) References Cited

U.S. PATENT DOCUMENTS

| | | | |
|---|---|---|---|
| 6,714,511 B1 | 3/2004 | Sudo et al. | |
| 7,437,140 B2 | 10/2008 | Iwamura | |
| 7,664,955 B2 | 2/2010 | Newman et al. | |
| 7,684,502 B2 | 3/2010 | Kurobe et al. | |
| 7,916,815 B2 | 3/2011 | Foxcroft et al. | |
| 8,261,079 B2 | 9/2012 | Newman et al. | |
| 8,369,359 B2 * | 2/2013 | Yoshizawa et al. | 370/470 |
| 8,514,774 B2 * | 8/2013 | Ge et al. | 370/328 |
| 8,611,288 B1 | 12/2013 | Zhang et al. | |

(Continued)

FOREIGN PATENT DOCUMENTS

| | | |
|---|---|---|
| JP | 2000299712 A | 10/2000 |
| JP | 2001217896 | 8/2001 |

(Continued)

OTHER PUBLICATIONS

"Home Plug Green PHY The Standard For In-Home Smart Grid Powerline Communications", *HomePlug Powerline Alliance Inc.* Jun. 14, 2010, 17 pages.

(Continued)

*Primary Examiner* — Hirdepal Singh
(74) *Attorney, Agent, or Firm* — DeLizio Law, PLLC

(57) ABSTRACT

A transmitting device may determine a physical layer transmission properties based upon an amount of data to transmit via a communications channel. The physical layer transmission properties may comprise a derated tone map that has a lower physical layer transmission throughput capability than an original tone map. An indication regarding the derated tone map may be included in a first message, a portion of a physical layer framing protocol, a physical layer control transmission (such as a frame control symbol), or other transmissions such that the receiving device can derive the derated tone map without significant added overhead.

22 Claims, 5 Drawing Sheets

(56) References Cited

U.S. PATENT DOCUMENTS

| | | |
|---|---|---|
| 8,665,908 B1 | 3/2014 | Zhang et al. |
| 2003/0083090 A1 | 5/2003 | Huh et al. |
| 2005/0111376 A1 | 5/2005 | Raghothaman et al. |
| 2005/0276242 A1 | 12/2005 | Goto et al. |
| 2006/0165011 A1 | 7/2006 | Starr et al. |
| 2007/0025386 A1 | 2/2007 | Riedel et al. |
| 2007/0109971 A1* | 5/2007 | Yoshida et al. ........... 370/236 |
| 2007/0211902 A1* | 9/2007 | Newman et al. ........... 380/278 |
| 2007/0254693 A1 | 11/2007 | Furukawa |
| 2008/0153428 A1 | 6/2008 | Han et al. |
| 2008/0170635 A1 | 7/2008 | Ochi et al. |
| 2008/0279126 A1* | 11/2008 | Katar et al. ........... 370/294 |
| 2008/0298382 A1* | 12/2008 | Galli et al. ........... 370/438 |
| 2008/0298531 A1 | 12/2008 | Troulis et al. |
| 2009/0040930 A1* | 2/2009 | Yonge et al. ........... 370/235 |
| 2009/0074044 A1 | 3/2009 | Yokomitsu et al. |
| 2009/0279616 A1 | 11/2009 | Hamanaka |
| 2009/0279638 A1* | 11/2009 | Kurobe et al. ........... 375/295 |
| 2009/0285321 A1 | 11/2009 | Schulz et al. |
| 2009/0300455 A1 | 12/2009 | Nakagawa |
| 2009/0304126 A1 | 12/2009 | Sahara |
| 2010/0040086 A1 | 2/2010 | Kimura et al. |
| 2010/0054314 A1 | 3/2010 | Korobkov et al. |
| 2010/0100741 A1 | 4/2010 | Newman et al. |
| 2010/0183087 A1 | 7/2010 | Hosokawa et al. |
| 2010/0220650 A1 | 9/2010 | Rison |
| 2010/0232333 A1 | 9/2010 | Higuchi et al. |
| 2010/0271972 A1* | 10/2010 | Fujii et al. ........... 370/252 |
| 2010/0296521 A1 | 11/2010 | Martinez et al. |
| 2010/0316140 A1 | 12/2010 | Razazian et al. |
| 2011/0026617 A1 | 2/2011 | Lee et al. |
| 2012/0030541 A1* | 2/2012 | Okamura ........... 714/758 |
| 2012/0218906 A1 | 8/2012 | Lampinen et al. |
| 2012/0250807 A1 | 10/2012 | Krishnan et al. |
| 2013/0051441 A1 | 2/2013 | Cho et al. |
| 2013/0148528 A1 | 6/2013 | Ko et al. |
| 2013/0203398 A1 | 8/2013 | Callard et al. |
| 2013/0310092 A1 | 11/2013 | Tabet et al. |
| 2014/0192846 A1 | 7/2014 | Afkhami et al. |
| 2014/0192847 A1 | 7/2014 | Afkhami et al. |
| 2014/0195637 A1 | 7/2014 | Tahir et al. |

FOREIGN PATENT DOCUMENTS

| | | |
|---|---|---|
| WO | 2014110275 | 7/2014 |
| WO | 2014110375 | 7/2014 |

OTHER PUBLICATIONS

"HomePlug AV White Paper", *HomePlug Powerline Alliance, Inc.* Aug. 18, 2005, 11 pages.

Co-pending U.S. Appl. No. 13/738,583, filed Jan. 10, 2013.

Co-pending U.S. Appl. No. 13/738,607, filed Jan. 10, 2013.

Co-pending U.S. Appl. No. 13/738,612, filed Jan. 10, 2013.

"PCT Application No. PCT/US2014/010900 International Search Report", Mar. 20, 2014, 12 pages.

"U.S. Appl. No. 13/738,583 Final Office Action", Sep. 23, 2014, 17 pages.

"International Application No. PCT/US2014/011050 International Search Report and Written Opinion", May 9, 2014, 14 pages.

"U.S. Appl. No. 13/738,583 Office Action", May 15, 2014, 20 pages.

Akyildiz, et al., "Next generation/dynamic spectrum access/cognitive radio wireless networks: A survey", Computer Networks, Elsevier Science Publishers B.V., Amsterdam, NL, vol. 50, No. 13, Sep. 15, 2006, 2127-2159.

Niyato, et al., "IEEE 802.16/WiMAX-based broadband wireless access and its application for telemedicine/e-health services", IEEE Wireless Communications, IEEE Service Center, Piscataway. NJ. US. vol. 14. No. 1., Feb. 1, 2007, 72-83.

"International Application No. PCT/US2014/011050 Written Opinion", Dec. 22, 2014, 9 pages.

"U.S. Appl. No. 13/738,612 Office Action", Dec. 31, 2014, 11 Pages.

"U.S. Appl. No. 13/738,607 Office Action", Jan. 16, 2015, 31 pages.

\* cited by examiner

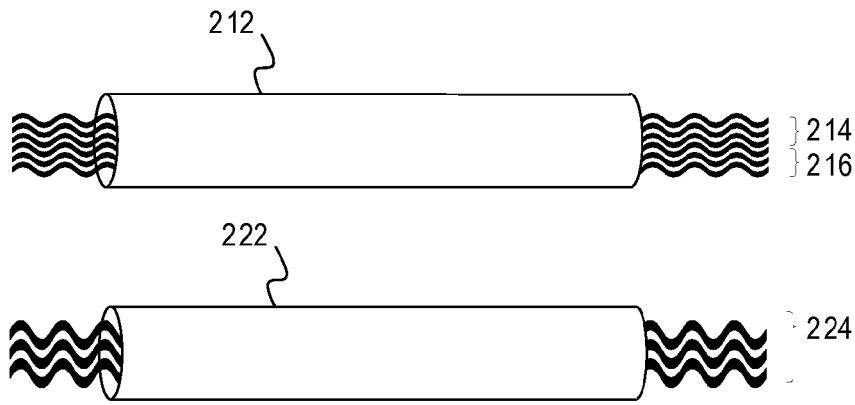

FIG. 2

|  | Tonemap 1 | Tonemap 2 |
|---|---|---|
| Number of carriers | 2690 carriers | 2690 carriers |
| Modulation (same on all carriers in this example) | QAM-1024 | QAM-16 |
| Bits per modulation cycle (each carrier) | 10 bits | 4 bits |
| Forward Error Correction Technique | 16/21 FEC | 16/21 FEC |
|  |  |  |
| Protocol Minimum Transmission Time (μs) | 46.52 μs | 46.52 μs |
| PHY transmission rate (mbps) | 440.5683 mbps | 176.2273 mbps |
|  |  |  |
| Data (bits) transmitted in one modulation cycle (using all carriers) | 20495 bits | 8198 bits |
| Data (bytes) in minimum transmission | 2561 bytes | 1024 bytes |
|  |  |  |
| Bytes to send | 520 bytes | 520 bytes |
| Amount of padding (bytes) | 2041 bytes | 504 bytes |

FIG. 3

ADJUSTING PHYSICAL LAYER TRANSMISSION PROPERTIES

BACKGROUND

Embodiments of the inventive subject matter generally relate to the field of network transmissions, and, more particularly, to adjusting physical layer transmission properties.

Communication technology is evolving to allow for better channel estimation and adaptation of transmissions over a communication channel. For example, in many technologies, such as powerline communications, a medium between a first device and a second device may support multi-carrier transmissions. Other medium and technologies may also use multi-carrier transmissions in which multiple frequencies are used over a communication channel.

SUMMARY

Various embodiments are disclosed which include derating physical layer transmission properties based on an amount of data to send via the communication channel. For transmissions of small amounts of data, using a derated tone map results in less data padding and more reliable reception.

In one embodiment, at least a first tone map for use over a communications channel between the first device and a second device is received at a first device. The first tone map may include transmission properties for each of a set of frequencies. A derated tone map different from the first tone map is determined at the first device. The derated tone map may be determined based at least in part upon an amount of data to transmit from the first device to the second device over the communications channel. The amount of data is transmitted to the second device using the derated tone map.

BRIEF DESCRIPTION OF THE DRAWINGS

The present embodiments may be better understood, and numerous objects, features, and advantages made apparent to those skilled in the art by referencing the accompanying drawings.

FIG. 2 is a conceptual illustration of two tone maps associated with physical layer transmission properties.

FIG. 3 is a table illustrating hypothetical comparisons of two different tone maps.

DESCRIPTION OF EMBODIMENT(S)

Figure 1:
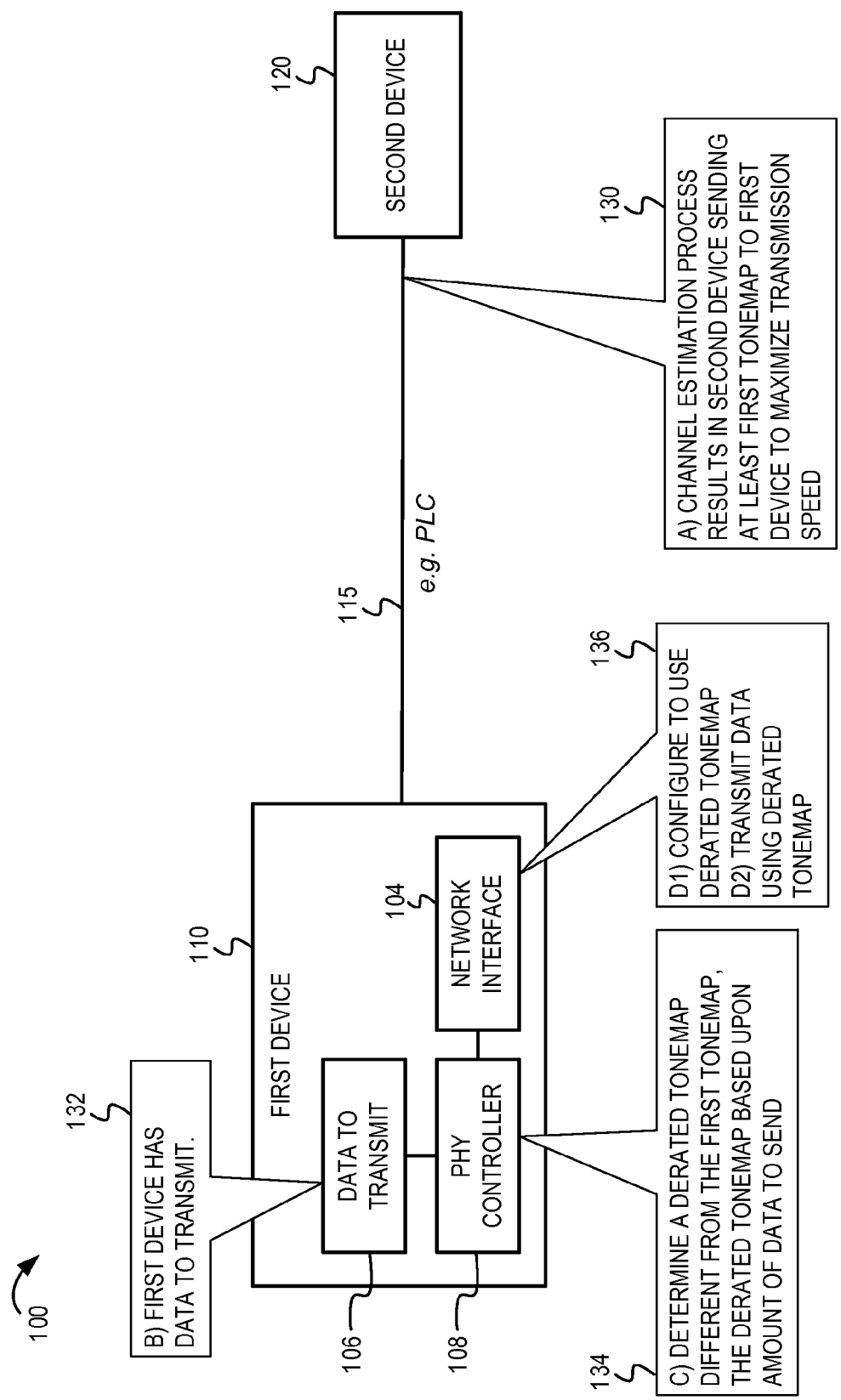
FIG. 1 is an example system diagram illustrating a process for adjusting physical layer transmission properties based on data.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In accordance with this disclosure, a transmitting device may determine a physical layer transmission properties based upon an amount of data to transmit via a communications channel. Typically a tone map is based upon channel quality and maximizing physical layer throughput. For example, a channel quality estimation process may be used to determine the maximum transmission rate possible for a communication channel. However, the transmission rate associated with a tone map may be inefficient—especially for transmissions involving small amounts of data. Traditional mechanisms for determining physical layer transmission properties may rely on a channel estimation process and rate setting at a receiving device.

In some embodiments, a transmitting device can determine a derated tone map based on an amount of data that it expects to send. A derated tone map may be based upon an originally offered tone map or may be a new tone map generated by a transmitting device. An indication referencing the derated tone map may be included in a first message, a portion of a physical layer framing protocol, a physical layer control transmission (such as a frame control symbol), or other transmissions. A receiver receiving such transmission or using such protocol may derive the derated tone map (based on the indication received from the transmitting device) and use the derated tone map to receive the data. In some embodiments, the derated tone map may be used when the transmitting device has less data to transmit than a minimum transmission unit of the offered tone map. In some embodiments, the derated tone map may be predefined by the transmitting device and receiving, such that use of the derated tone map is selectable by a transmitting device based upon an amount of data to be sent. In other embodiments, the derated tone map may be dynamically defined by a transmitter and receiver using analogous derating factor calculations.

In this disclosure, examples are provided based upon powerline communication technology. It should be understood that the techniques herein may apply to other technologies that use multi-carrier transmissions over a communications channel between a first device and a second device. Although examples in this disclosure refer to tone maps and powerline communications, the scope of this disclosure should not be limited as such. Rather, the use of this disclosure may be used with adjusting a variety of physical layer transmission properties in a variety of communication technologies. The terms channel estimation, channel adaptation information, tone map, etc., while common terminology to persons of skill in the art of powerline communication technology, may have analogous terms of similar meaning in other communications technologies.

FIG. 1 is an example system diagram illustrating a process for adjusting physical layer transmission properties based on data. In FIG. 1, a first device 110 is communicatively coupled to a network 115 using a network interface 104. In the example system 100 of FIG. 1, the network 115 is based upon powerline communication (PLC) and the physical layer involves a power line transmission medium. Also coupled to the network 115 is a second device 120. The first device 110 has data 106 that is queued for transmission to the second device 120. The first device also has a physical layer controller 108. It should be noted that in some implementations, the physical layer controller 108 may be included in the network interface or integrated with the network interface as an integrated apparatus. The physical layer controller 108 provides configuration of the network interface 104, including physical layer transmission properties. The physical layer transmission properties may include settings for modulation, carrier usage, forward error control, guard interval spacing, frequency or time division multiplexing, etc. A communication channel, such as a communication channel via network 115 between the first device 110 and the second device 120, may have a variety of configurable physical layer transmission properties. The communication channel may include the use of orthogonal frequency division multiplexing or other techniques which allow for the combination of multiple carriers (i.e. frequencies) over the same communication channel.

At stage A (referenced at 130), a channel estimation process is performed. Typically a channel estimation process is used to determine the quality associated with each carrier (i.e. frequency) over the communications channel. In a typical channel estimation process, a transmitting device sends a signal that can be detected and measured by a receiving device. The receiving device analyzes the quality characteristics of the received signal to determine communications properties for each carrier. Upon completion of channel estimation processes, the receiving device may send a tone map (which may also be referred to as "channel adaptation information") back to the transmitter. The tone map includes transmission properties (e.g. modulation, coding rate, error correction, etc.) for one or more carriers used in the communications channel. Typically the tone map is assigned to provide the greatest throughput possible by the communications channel.

A powerline communications channel between any two links has a different amplitude and phase response. Therefore, adapting the transmission properties for each carrier may result in a higher data rate. Some carriers may be deselected (e.g. masked) for use on the communications channel, while other carriers may utilize higher or lower modulation and data rates depending on the quality associated with each carrier. By turning off impaired frequencies, the bit error rates may be decreased on neighboring frequencies. On the remaining frequencies, selections regarding modulation, coding rate, and error correction for each carrier may result in a highly optimized link throughput. Channel quality is estimated at regular intervals for each carrier and a tone map is used to define which carriers are used to transmit data, as well as the type of modulation and error correction coding to be used. Accordingly, the tone map typically includes the channel adaptation information defining transmission properties for each carrier. The tone map is communicated from the receiving device to the transmitting device. In some variations, a receiving device may generate multiple tone maps to be used at different periods of time in the time domain of the communication channel. For example a first tone map may be assigned for a downward portion of a power cycle, and a second tone map may be used during the peak portion of the power cycle. The different tone maps may be provided by the receiving device to instruct the transmitting device which physical layer transmission properties to use during each period of the power cycle.

At stage B (referenced at 132), the first device 110 may have data 106 ready for transmission via network 115 to the second device 120. The data may come from upper layers of the first device 110 or may come from another network interface (not shown), wherein the first device is configured to bridge data from the other network interface to the network interface 104. In some implementations, the data may be temporarily stored in a transmission buffer (not shown) of the first device 110.

At stage C (referenced at 134), the physical layer controller 108 may determine a derated tone map, different from the tone map provided by the second device 120. The derated tone map may use a slower data transmission rate than the tone map provided by the receiving second device 120. As shown in FIGS. 2-3, even though a slower data transmission rate is used, the buffered data from the first device 110 may arrive at the second device 120 within an equivalent period of time. However, the derated tone map may be more desirable due to increased reliability associated with the different physical layer transmission properties.

At stage D1 (referenced at 136), the network interface 104 may be configured by the physical layer controller 108 to use the derated tone map rather than the tone map provided by the second device 120. In some embodiments, a mechanism for coordinating the derated tone map between the first device 110 and second device 120 may involve the first device 110 communicating the transmitter-generated tone map to the second device 120. In some example systems, communicating a full tone map may add a relatively large amount of overhead bandwidth. Therefore, in some implementations, rather than communicating a full transmitter-generated tone map, an indication regarding the transmitter-generated tone map may be communicated to the second device 120 to allow the second device 120 to derive the transmitter-generated tone map from the indication. For example, the indication may be associated with a derating factor, a predefined derating algorithm, an index to a predefined derated tone map, or other indications which a receiving device may use to derive the same derated tone map determined by the transmitting device. The second device 120 receives the indication and configures a receiving network interface (not shown) to receive, demodulate, and decode the transmission in accordance with the derated tone map. At stage D2 (referenced at 136), the first device 110 transmits the data using the derated tone map.

FIG. 2 is a conceptual illustration of two tone maps associated with physical layer transmission properties. Typically, tone maps are chosen to maximize data throughput by choosing the highest possible transmission properties that result in a tolerable amount of errors in a physical layer transmission. However, the physical layer throughput capability may exceed the upper layer throughput needed based on the amount of data to be transmitted. In a traditional system, to accommodate the physical layer throughput, the transmitting device may need to add padding or dummy data to fill the physical layer minimum transmission unit (e.g. packet data unit, frame, or block). As a result, much of the transmission medium may be wasted or unused.

In the conceptual illustration, a first example 212 is utilizing a first tone map (such as a tone map provided by a receiving device to maximize the channel utilization). In the first communication channel 212, only a portion of the physical layer throughput may include actual data 214 and another portion of the physical layer throughput may include padding or dummy data 216. It should be understood that while these are indicated conceptually as neighboring, exclusive lines in FIG. 2, in actual implementations the padding may be mixed with actual data throughout the communications channel. In traditional systems, a receiving device may receive, demodulate, and decode the full communication before discarding the padding data. In FIG. 2, the first tone map utilizes a more "aggressive" physical layer throughput capability for physical layer transmission properties than a derated tone map. The aggressive physical layer throughput may require higher orders of modulation, less error correction, or other settings which are intended to maximize transmission of data over the first communication channel 212.

A second example 222 is configured with a derated tone map. The derated tone map may have a lower physical layer throughput (including a smaller physical layer minimum transmission unit). In other words, the derated tone map is less aggressive than the first tone map of the first example 212. However, communications may be more reliable than the first example 212 in the derated tone map. Additionally, the derated tone map may have a lower error rate while still conveying the same amount of upper layer data 224 that the first tone map would convey.

It should be understood that the derated tone map may utilize the same number of carriers and same frequencies as offered in the first tone map. Other physical layer transmission properties may be modified, such as a modulation and coding scheme, guard spacing, cyclic prefixing, error coding, data replication, etc.

FIG. 3 is a table 300 illustrating hypothetical comparisons of two different tone maps. Properties and calculations associated with a first example tone map are shown in a first column 330. Properties and calculations associated with a second example tone map are shown in a second column 340. In the interest of illustrating a simple comparison, several basic properties are kept consistent. In fact, the only physical layer transmission property different from the first example tone map to the second example tone map is the modulation scheme. Thus, consistent properties of the communication channel include the use of 2690 usable carriers in the communications channel, a common 16/21 forward error correction (FEC) scheme, and a predetermined symbol duration (such as 46.52 μs in this example). For example, a powerline communications network may be associated with a symbol duration of 46.52 μs. The symbol duration (46.52 μs) may be based on an orthogonal frequency division multiplexing (OFDM) symbol (e.g. 3072 FFT points at 75 MHz=40.96 μs) plus a guard interval (5.56 μs guard interval). In both example tone maps, a forward error correction technique is being used in which 16 bits of data and 5 bits of error correction are sent, resulting in 16/21 ratio of data for transmissions.

In the first example tone map, the tone map utilizes QAM-1024 modulation scheme (which conveys 10 bits of data per symbol on each carrier). In the first example tone map, the base tone map physical transmission rate would be 440.5683 mbps (2690 carriers×10 bits per symbol×16/21 FEC/46.52 μs). To determine the minimum transmission in bytes the rate (440.5683 mbps) is multiplied by the symbol duration (46.52 μs) and divide by 8 (8 bits per byte), resulting in 2561.905 bytes that would be transmitted in a minimum transmission unit of the offered tone map. Another approach is to consider a single symbol period. In a single symbol period of the first example tone map, 20495 bits or 2561 bytes (8 bits per byte) may be transmitted (based on 10 bits per symbol×2690 carriers×16/21 FEC). In a scenario in which the transmitting device has 520 bytes of data to send, in utilizing the first example tone map, the transmitter would add 2041 bytes of padding data in order to accommodate the 2561 bytes needed for a minimum transmission unit.

In the second example tone map, the tone map utilizes QAM-16 modulation scheme (which conveys 4 bits per symbol on each carrier). For this example, all other physical layer transmission properties remain the same from the previous example. Using 2690 carriers×4 bits per symbol×16/21 FEC/46.52 μs, the resulting derated tone map has a physical layer throughput capability of 176.2273 mbps. In a single symbol period of the second example tone map, 8198 bits or 1024 bytes (8 bits per byte) may be transmitted (based on 4 bits per symbol×2690 carriers×16/21 FEC). In utilizing the first example tone map, the transmitter would add 504 bytes of padding data to the 520 bytes of actual data in order to accommodate the 1024 bytes needed for a minimum transmission unit.

It should be apparent that in the example tone maps, the same frequency and symbol period is used. Therefore, even though the first example tone map had a greater physical layer throughput capability of over 440 mbps compared to the physical layer throughput capability of 176 mbps of the second example tone map, both tone maps sent the same 520 bytes of actual data in the same period of time. In order to improve reliability of transmissions, the first example tone map may be derated to the second example tone map so as to deliver the same amount of data in the same amount of time. It should be apparent that the second tone map is more reliable than the first tone map because there is less probability of modulation symbol decoding errors when using QAM-16 than when using QAM-1024. The likelihood of modulation errors is reduced because the constellation points are more widely spaced in QAM-16 than in QAM-1024.

In the examples in FIG. 3, only the modulation scheme was modified. However, other physical layer transmission properties may also be derated. For example a case might be to utilize a lower code rate that would still result in a tone map capable of carrying the same amount data (as shown in the example above). Another approach could be to determine a new full tone map based on the original tone map and the new desired physical transmission rate (determined from the amount of data to be sent in the amount available time). A new full tone map may have different transmission properties for the various carriers in the communication channel (keeping the receiver-generated tone map as maximum values).

In the case of powerline communications, changing the tone map currently requires an exchange of channel adaptation information from the receiver to the transmitter. However, the tone map can include a significant amount of transmission properties. Consider, for example, a communications channel capable of 1200 carriers. Transmitting a tone map for the communications channel may consume a large amount of channel overhead. Therefore, it may not be practical for the transmitting device to negotiate a tone map for each transmission. However, in accordance with some implementations, a transmitting device may adjust (derate) a tone map based on the amount of upper layer data available to transmit and the minimum transmission unit. An indication from the transmitter device may be sent in coordination with the physical layer transmission such that the receiving device may derive the derated tone map without having a full exchange of channel adaptation information.

Figure 4:
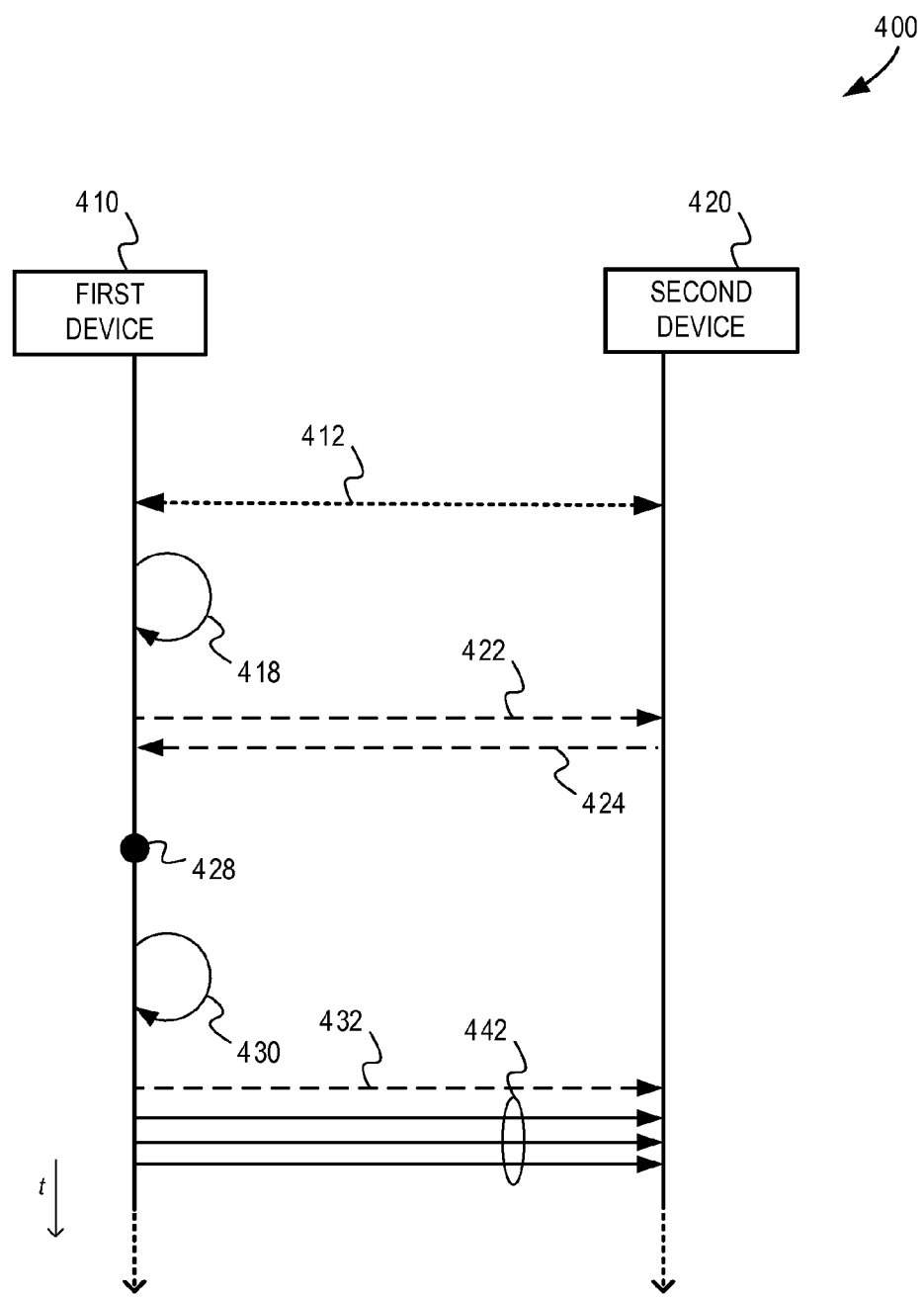
FIG. 4 is a message flow diagram illustrating example communications between two devices in accordance with at least one embodiment of this disclosure.

FIG. 4 is a message flow diagram illustrating an embodiment of the present disclosure. A first device 410 may be configured to communicate with a second device 420 over a communication channel (not shown). Beginning at 412, a channel estimation process may be performed. This may include the first device 410 transmitting a training sequence, markers, or other measurement transmissions and the second device 420 utilizing the received training sequence, markers, or measurement transmissions to determine channel quality. The second device 420 may provide a receiver-generated tone map back to the first device 410 for use in subsequent communications. At 418, the first device may configure the network interface to use the receiver-generated tone map. At 422 and 424, one or more other configuration messages may be exchanged between the first device 410 and the second device

420. For example, configuration messages may include other predefined tone maps, scheduling information, network topology information, etc.

At 428, the first device 410 determines that it has data to transmit to the second device 420. At 430, the first device 410 determines a derated tone map based, in one embodiment at least in part, upon the amount of data to transmit. The derated tone map may also or otherwise be based in part upon the receiver-generated tone map (e.g. for increasing values of physical layer transmission properties, or for determining a derating factor that can be applied to down-step various properties of the receiver-generated tone map).

At 432, the first device 410 may communicate an indication to the second device 420 to indicate that a derated tone map will be used. For example, the first device 410 may communicate a signal indicative of a derating factor or derating algorithm used to generate the derated tone map from the first tone map. In one embodiment, the signal may be communicated in a frame control portion of a physical layer transmission unit.

At 442, the first device 410 may communicate the data to the second device 420. It should be understood that the derated tone map may be reused for additional communications from the first device 410 to the second device 420. For example, the derated tone-map may be used for a plurality of small-data messages periodically sent from the first device 410 to the second device 420. A number of applications may utilize periodic or aperiodic small messages, such as voice or video packets, TCP feedback, or discontinuous periodic transmissions.

Figures 5, 6:
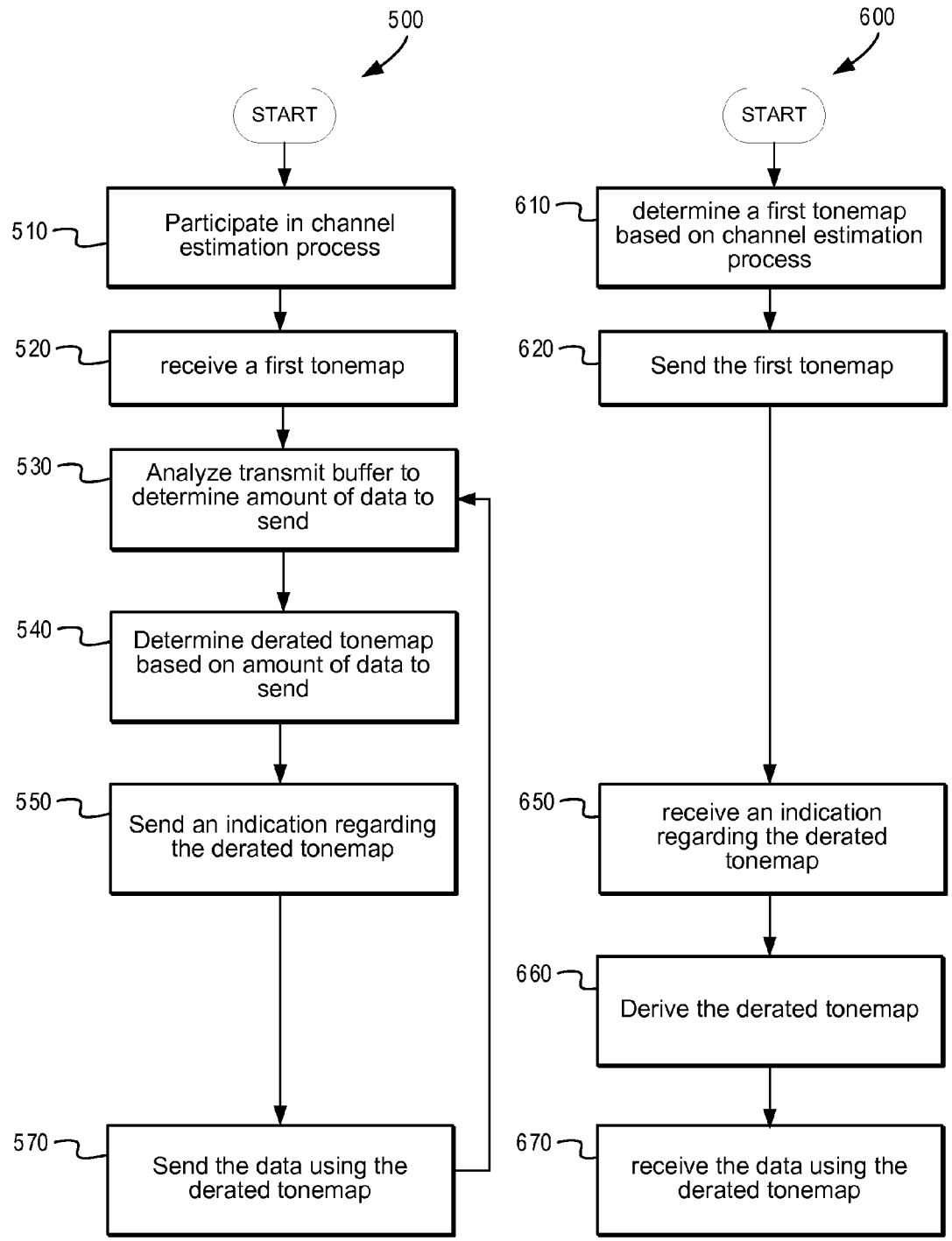
FIG. 5 is a flow diagram illustrating example operations at a transmitter for adjusting physical layer transmission properties.
FIG. 6 is a flow diagram illustrating example operations at a receiver to receive data for which physical layer transmission properties are adjusted.

FIG. 5 is a flow diagram 500 illustrating example operations at a first device for adjusting physical layer transmission properties. The example operations may be performed by one or more components of a device, such as a physical layer controller, one or more communication unit processors, or one or more processors of a hybrid device. At 510, the first device may participate in a channel estimation process. At 520, the first device receives a tone map from the second device. At some point, the first device obtains data (e.g. packet stream, which may include voice application or data application packets) to be transmitted to the second device. It should be understood that the data may be obtained from upper layers of the first device or may be associated with a packet stream being forwarded via the first device.

At 530, the first device analyzes a transmit buffer to determine an amount of data to send. At 540, the first device determines a derated tone map based at least in part upon the amount of data to send. For example, the derated tone map may be determined using example operations described in FIGS. 1-4.

At 550, the first device may send an indication regarding the derated tone map. For example, the first device may signal, in a frame control symbol (FCS), a code representing a derating algorithm. By using a small code point in the FCS, the transmitting device may indicate that a derated tone maps is utilized without adding significant overhead to existing protocols. In some embodiments, the transmitting device may simply indicate the amount of derating applied and/or the derating algorithm employed. In some embodiments, a derating index may be used to reference a previously exchanged derated tone map or to reference a predefined derated tone map known to both the first device and the second device.

At 570, the first device sends the data using the derated tone map. In some implementations, the first device may repeat the operations at blocks 530-570 if there is additional data in the transmit buffer.

FIG. 6 is a flow diagram 600 illustrating example operations at a second device for receiving transmissions with adjusted physical layer transmission properties. At 610, the second device may participate in a channel estimation process and determine a first tone map based on the channel estimation process. At 650, the second device may receive an indication regarding the derated tone map.

At 660, the second device may derive the derated tone map based upon the indication and the previous first tone map. For example, the indication may comprise a derating factor that the second device can use to derive the derated tone map. Alternatively, a code point, index, indication regarding a derating algorithm or other information may be included in the indication such that the second device may derive the derated tone map. At 670, the second device receives the data using the derated tone map.

By having the first device and second device employ the same derating algorithm, the first device may indicate a derated tone map without communicating a full or partial tone map. For example, a signal from the first device to the second device could indicate a rating factor or algorithm being applied to adjust the offered tone map. This signal could be included, in one example, as part of a physical layer transmission unit header, or as an overhead signal. Rather than sending a new full tone map for each transmission, the first device could include some bits (e.g. in a frame control symbol of the physical layer transmission unit) that indicate how the tone map has been adjusted. The bits could represent a derating factor, reductions in the modulation, error correction technique, or coding rate. The second device would use this information, along with the current tone map, to calculate a unique tone map for this packet. It should be understood that the derating algorithm could be implemented in hardware or software.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
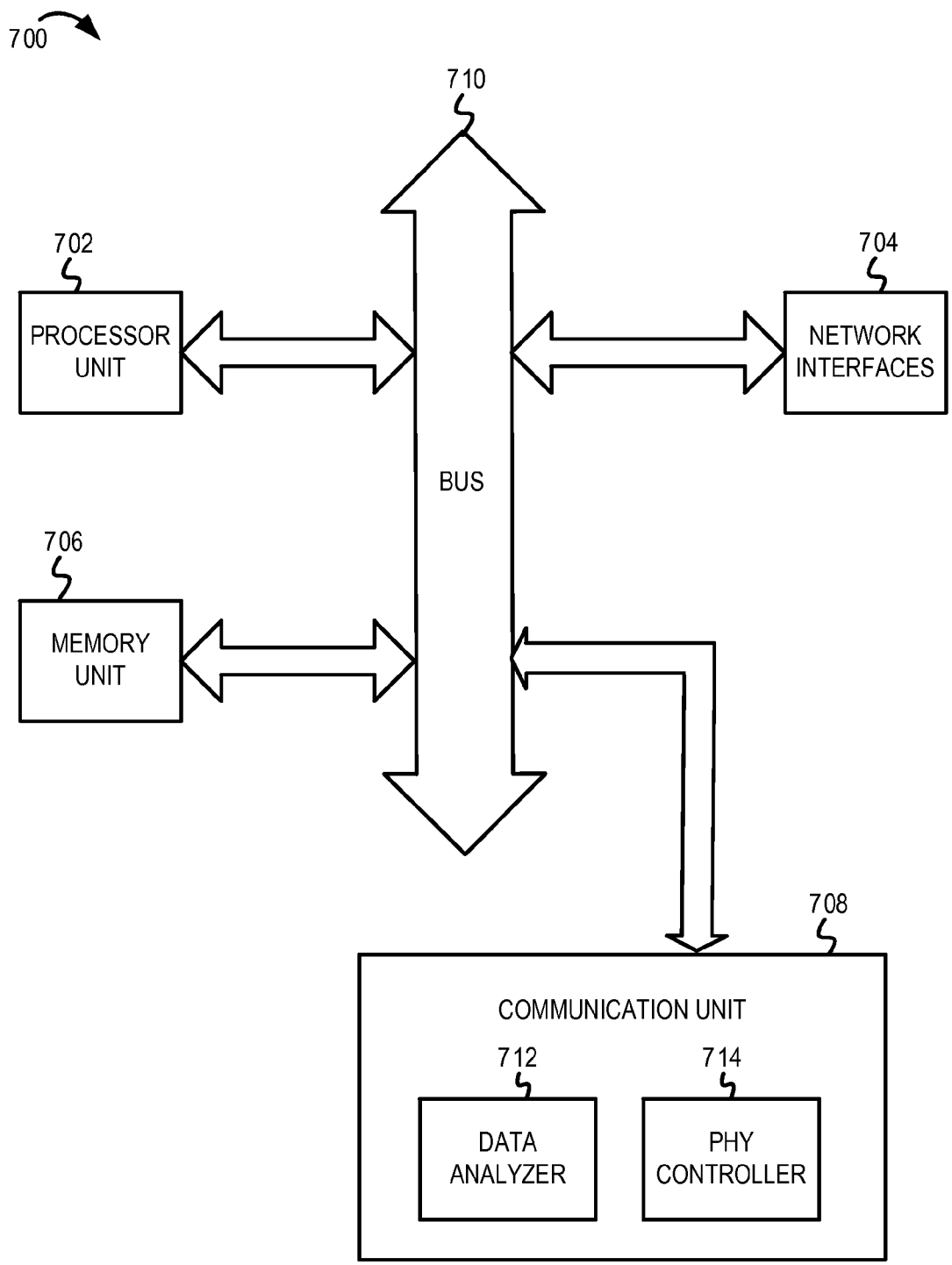
FIG. 7 is an example block diagram of one embodiment of an electronic device including a communication unit for adjusting physical layer transmission properties.

FIG. 7 is an example block diagram of one embodiment of an electronic device 700 including a communication unit for adjusting physical layer transmission properties. In some implementations, the electronic device 700 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 700 may include a processor unit 702 (possibly including multiple processors, multiple cores, multiple nodes, and/or implementing multithreading, etc.). The electronic device 700 may include a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 may also include a bus 710 (e.g., PCI, ISA, PCI-Express, HyperTransport®, InfiniBand®, NuBus, AHB, AXI, etc.), and one or more network interfaces (such as network interface 704). Network interface 704 may be a wireless network interface (e.g., a WLAN interface, a Bluetooth® interface, a WiMAX interface, a ZigBee® interface, a Wireless USB interface, etc.) or a wired network interface (e.g., an Ethernet interface, a powerline communication interface, etc.). In some implementations, the electronic device 700 may support multiple network interfaces—each of which is configured to couple the electronic device 700 to a different communication network.

The electronic device 700 also includes a communication unit 708. The communication unit 708 comprises a data analyzer 712 and a physical layer controller 714. As described above in FIGS. 1-6, the physical layer controller 714 may implement functionality to determine a derated tone map and configure the network interface 704 with adjusted physical layer transmission properties of the derated tone map. It should be understood, that in some embodiments, the communication unit 708 may also have a dedicated processor (e.g., such as a communication unit comprising a system on a chip, or board with multiple chips, or multiple boards, in which the communication may have one or more dedicated processor or processing unit(s), in addition to the processor unit 702). Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interface 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, determining adjusted tone maps as described herein may be implemented with facilities consistent with any hardware system or hardware systems. Many variations, modifications, additions, and improvements are possible. For example, while embodiments described herein refer to derated tone maps, alternative embodiments may utilize uprated tone maps generated at a transmitting device based upon from a conservative tone map offered by the receiving device. Uprated tone maps may be generated based upon the amount of data being larger than associated with a minimum transmission unit of the offered conservative tone map. Similar to derating factors and derating algorithms, alternative embodiments may utilize uprating factors and uprating algorithms.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving, at a first device, a first tone map used for data transmission via a communications channel between the first device and a second device, the first tone map including transmission properties for each of a set of frequencies;
   determining that an amount of data available to transmit from the first device to the second device via the communications channel is less than a transmission size for a minimum transmission unit associated with the first tone map;
   determining, at the first device, a derated tone map different from the first tone map in response to determining that the amount of data available to transmit is less than the transmission size for the minimum transmission unit associated with the first tone map; and
   transmitting the data using the derated tone map.

2. The method of claim 1, wherein the first tone map is based, at least in part, on a channel estimation process.

3. The method of claim 1, further comprising:
   determining a first physical layer transmission rate based, at least in part, on the first tone map and a protocol minimum transmission unit;
   determining a second physical layer transmission rate associated with the amount of data and the protocol minimum transmission unit; and
   comparing the first physical layer transmission rate with the second physical layer transmission rate to determine a derating factor.

4. The method of claim 1, wherein the derated tone map utilizes a smaller modulation scheme for at least one frequency included in the first tone map.

5. The method of claim 1, further comprising:
   communicating, to the second device, a signal indicative of a derating factor or derating algorithm used by the first device to determine the derated tone map from the first tone map,
   wherein the derating factor or derating algorithm is usable by the second device to determine a same derated tone map from the first tone map.

6. The method of claim 5, wherein the signal is communicated in a frame control portion of a physical layer transmission unit.

7. The method of claim 1,
   wherein, in the first tone map, said transmission properties for each of the set of frequencies include at least one member of a group consisting of a modulation scheme, a forward error correction scheme, a coding rate, and a guard interval; and
   wherein the derated tone map adjusts at least one member of a group consisting of the modulation scheme, the forward error correction scheme, the coding rate, and the guard interval for at least one frequency in the set of frequencies.

8. The method of claim 7, wherein the derated tone map adjusts at least one member of a group consisting of the modulation scheme, the forward error correction scheme, the coding rate, and the guard interval for all frequencies in the set of frequencies using a derating factor applied to the transmission properties in the first tone map.

9. A first device comprising:
   a physical layer controller configured to:
      receive a first tone map including transmission properties for each of a set of frequencies used for data transmission via a communications channel between the first device and a second device,
      determine that an amount of data available to transmit from the first device to the second device via the communications channel is less than a transmission size for a minimum transmission unit associated with the first tone map, and
      determine a derated tone map different from the first tone map in response to determining that the amount of data available to transmit is less than the transmission size for the minimum transmission unit associated with the first tone map; and
   a network interface configured to transmit the data using the derated tone map.

10. The first device of claim 9, wherein the first tone map is based, at least in part, on a channel estimation process.

11. The first device of claim 9, wherein said physical layer controller is further configured to:
    determine a first physical layer transmission rate based, at least in part, on the first tone map and a protocol minimum transmission unit;
    determine a second physical layer transmission rate associated with the amount of data and the protocol minimum transmission unit; and
    compare the first physical layer transmission rate with the second physical layer transmission rate to determine a derating factor.

12. The first device of claim 9, wherein the derated tone map utilizes a smaller modulation scheme for at least one frequency included in the first tone map.

13. The first device of claim 9, wherein said physical layer controller is further configured to:
    communicate a signal indicative of a derating factor or derating algorithm used by the first device to determine the derated tone map from the first tone map,
    wherein the derating factor or derating algorithm is usable by the second device to determine a same derated tone map from the first tone map.

14. The first device of claim 13, wherein the signal is communicated in a frame control portion of a physical layer transmission unit.

15. The first device of claim 9,
wherein, in the first tone map, said transmission properties for each of the set of frequencies include at least one member of a group consisting of a modulation scheme, a forward error correction scheme, a coding rate, and a guard interval; and
wherein the derated tone map adjusts at least one member of a group consisting of the modulation scheme, the forward error correction scheme, the coding rate, and the guard interval for at least one frequency in the set of frequencies.

16. The first device of claim 15, wherein the derated tone map adjusts one or more at least one member of a group consisting of the modulation scheme, the forward error correction scheme, the coding rate, and the guard interval for all frequencies in the set of frequencies using a derating factor applied to the transmission properties in the first tone map.

17. A method comprising:
providing a first tone map from a first device to a second device used for data transmission via a communications channel between the first device and the second device, the first tone map including transmission properties for each of a set of frequencies;
receiving, at the first device, an indication regarding a derated tone map different from the first tone map, the derated tone map determined by the second device based, at least in part, on an amount of data available to transmit from the second device to the first device via the communications channel, the amount of data being less than a transmission size for a minimum transmission unit associated with the first tone map; and
receiving the data from the second device using the derated tone map.

18. The method of claim 17, wherein the indication is included in a frame control symbol of a physical layer transmission unit.

19. The method of claim 17, wherein the indication is a derating factor, and the method further comprises:
determining, at the first device, the derated tone map based, at least in part, on the derating factor and the first tone map.

20. A non-transitory computer readable medium storing instructions which when executed by a processor of a device cause the device to:
receive, at a first device, a first tone map used for data transmission via a communications channel between the first device and a second device, the first tone map including transmission properties for each of a set of frequencies;
determine that an amount of data available to transmit from the first device to the second device via the communications channel is less than a transmission size for a minimum transmission unit associated with the first tone map;
determine, at the first device, a derated tone map different from the first tone map in response to determining that the amount of data available to transmit is less than the transmission size for the minimum transmission unit associated with the first tone map; and
transmit the data using the derated tone map.

21. The non-transitory computer readable medium of claim 20, wherein the first tone map is based, at least in part, on a channel estimation process.

22. The non-transitory computer readable medium of claim 20, wherein the instructions, when executed by the processor of the device, cause the device to:
determine a first physical layer transmission rate based, at least in part, on the first tone map and a protocol minimum transmission unit;
determine a second physical layer transmission rate associated with the amount of data and the protocol minimum transmission unit; and
compare the first physical layer transmission rate with the second physical layer transmission rate to determine a derating factor.

* * * * *